(12) United States Patent
Foster et al.

(10) Patent No.: US 12,110,108 B2
(45) Date of Patent: Oct. 8, 2024

(54) SYSTEMS AND METHODS FOR EJECTING A STORE FROM AN AIRCRAFT

(71) Applicant: THE BOEING COMPANY, Chicago, IL (US)

(72) Inventors: John K. Foster, St. Peters, MO (US); Ryan Binkholder, Webster Groves, MO (US); Thaddeus Jakubowski, Jr., St. Charles, MO (US)

(73) Assignee: The Boeing Company, Chicago, IL (US)

( * ) Notice: Subject to any disclaimer, the term of this patent is extended or adjusted under 35 U.S.C. 154(b) by 322 days.

(21) Appl. No.: 17/654,251

(22) Filed: Mar. 10, 2022

(65) Prior Publication Data
US 2023/0002050 A1 Jan. 5, 2023

Related U.S. Application Data

(60) Provisional application No. 63/217,053, filed on Jun. 30, 2021.

(51) Int. Cl.
*B64D 1/04* (2006.01)
*B64C 30/00* (2006.01)

(52) U.S. Cl.
CPC ............... *B64D 1/04* (2013.01); *B64C 30/00* (2013.01)

(58) Field of Classification Search
CPC ... B64D 1/04; B64D 1/08; B64D 1/10; B64D 1/12; B64D 7/08; B64D 1/06; B64D 1/00; B64D 9/00; B64D 9/003; B64D 2009/006; F41F 3/06; F41F 3/04; B64U 2101/64; B64U 2101/60; B64U 2101/00; B64C 1/1415; B64C 1/22
See application file for complete search history.

(56) References Cited

U.S. PATENT DOCUMENTS

| | | | | |
|---|---|---|---|---|
| 3,128,068 A | * | 4/1964 | Pauli ................ | B64C 1/1415 244/113 |
| 3,561,578 A | * | 2/1971 | Goodwin .......... | B65G 13/075 193/40 |
| 4,088,288 A | * | 5/1978 | Barnes .............. | B64C 1/1415 244/129.5 |
| 4,161,301 A | * | 7/1979 | Beardsley ......... | B64D 1/10 89/1.51 |
| 4,415,298 A | * | 11/1983 | Voigt ................ | B60P 7/13 410/77 |

(Continued)

FOREIGN PATENT DOCUMENTS

WO WO-2007065175 A2 * 6/2007 ............... B64G 1/14

*Primary Examiner* — Joshua J Michener
*Assistant Examiner* — Cindi M Curry
(74) *Attorney, Agent, or Firm* — Joseph M. Butscher; The Small Patent Law Group, LLC

(57) ABSTRACT

A system and method for ejecting a store from an aircraft include a stowage tube configured to retain the store. The stowage tube includes an open rear end. A door panel is coupled to the stowage tube. An actuator driven linkage is coupled to the door panel. The actuator driven linkage is configured to rotate the door panel about a pivot axis at a forward edge opposite from an aft end between a closed position associated with a stowed position of the system and an open position associated with a deployed position of the system. The stowage tube is configured to rearwardly eject the store out of the open rear end when the system is in the deployed position.

20 Claims, 10 Drawing Sheets

(56) References Cited

U.S. PATENT DOCUMENTS

| | | | | |
|---|---|---|---|---|
| 7,854,189 B1* | 12/2010 | Fox | ............................ | F41F 3/04 |
| | | | | 89/1.804 |
| 2012/0292444 A1* | 11/2012 | Jaurand | ................. | B64C 39/024 |
| | | | | 244/118.1 |
| 2012/0325969 A1* | 12/2012 | Helmner | ................... | B64D 9/00 |
| | | | | 244/137.1 |
| 2013/0315686 A1* | 11/2013 | Johnson | ................... | B64D 1/06 |
| | | | | 410/116 |

* cited by examiner

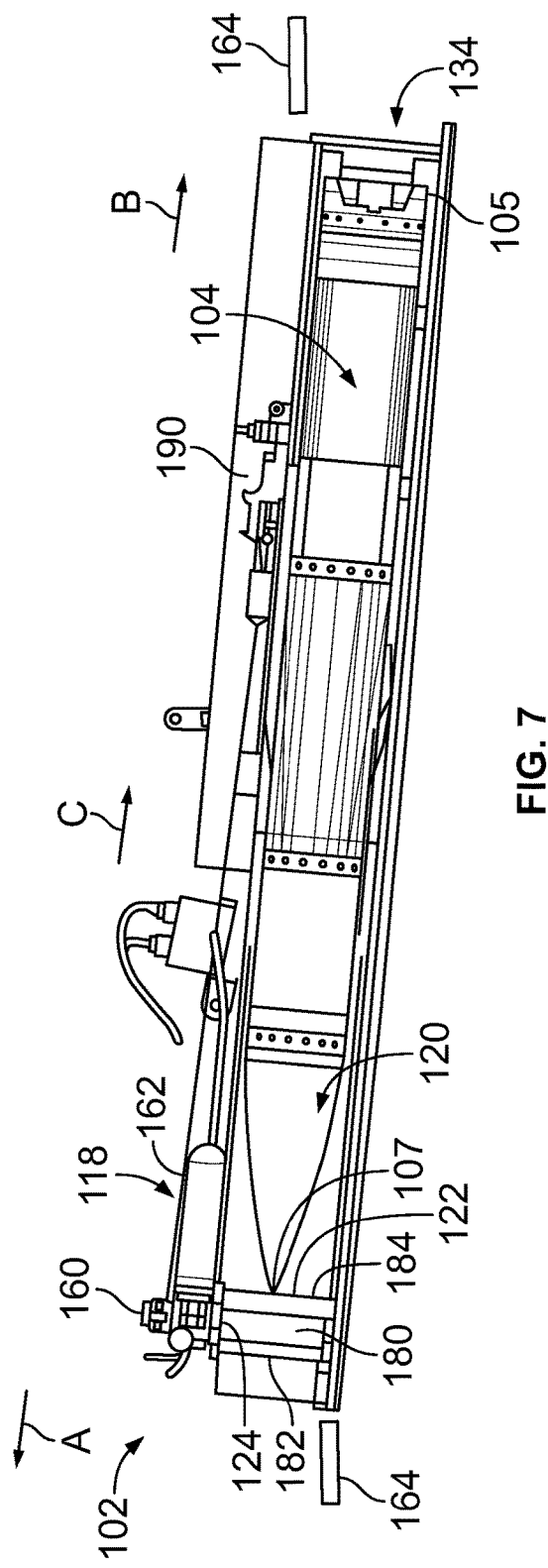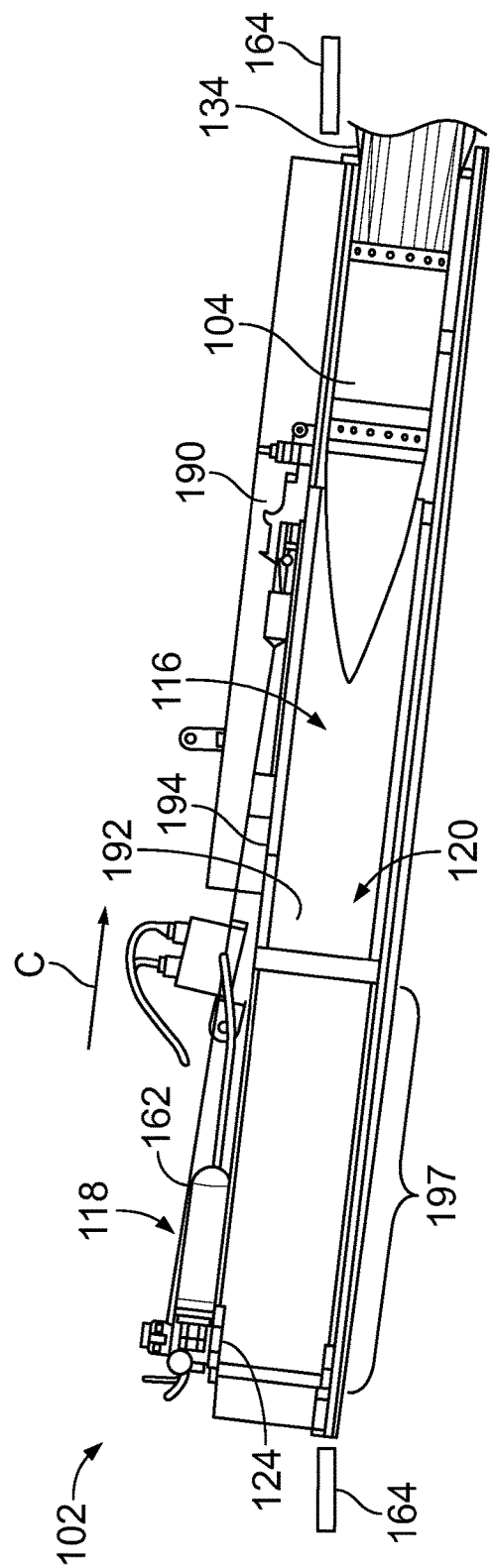

SYSTEMS AND METHODS FOR EJECTING A STORE FROM AN AIRCRAFT

CROSS-REFERENCE TO RELATED APPLICATION

This application is a non-provisional application of U.S. Patent Application No. 63/217,053, filed Jun. 30, 2021, and the entire disclosure of which is incorporated herein by reference.

FIELD OF THE DISCLOSURE

Examples of the subject disclosure generally relate to systems and methods for ejecting a store from an aircraft.

BACKGROUND OF THE DISCLOSURE

Certain aircraft are configured to house stores that can be deployed during flight. For example, certain military aircraft are configured to discharge various types of stores, such as munitions including bombs, missiles, rockets, or the like, and non-munitions, such as electronic equipment, devices, chaff, decoys, and/or the like. As another example, commercial aircraft can be configured to discharge various stores, such as products for delivery (which may be coupled to parachutes).

Known methods for internal store deployment include doors opening in the inboard or outboard direction about an axis that is parallel to a longitudinal axis of an aircraft. Such systems are configured to allow the stores to drop down from the aircraft. Such methods for store deployment are suitable for subsonic and supersonic store release.

However, in relation to hypersonic aircraft, extreme airloads and temperatures associated with store release make traditional known deployment methods impossible or next to impossible. In particular, during hypersonic flight, aerodynamic flow fields along with a turbulent boundary layer proximate to the hypersonic aircraft create strong shocks on surfaces (such as bay doors) protruding from a mold line of the aircraft. Additionally, cavity flow in a store bay can cause intense acoustic shocks on the bay structure. Further, air friction can generate extreme heat on surfaces of the hypersonic aircraft.

SUMMARY OF THE DISCLOSURE

A need exists for an efficient and effective system and method for deploying one or more stores from an aircraft. Further, a need exists for a system and method for deploying one or more stores from a hypersonic aircraft.

With those needs in mind, certain embodiments of the subject disclosure provide a system for ejecting a store from an aircraft. The system includes a stowage tube configured to retain the store. The stowage tube includes an open rear end. A door panel is coupled to the stowage tube. An actuator driven linkage is coupled to the door panel. The actuator driven linkage is configured to rotate the door panel about a pivot axis at a forward edge opposite from an aft end between a closed position associated with a stowed position of the system and an open position associated with a deployed position of the system. The stowage tube is configured to rearwardly eject the store out of the open rear end when the system is in the deployed position.

In at least one embodiment, the system also includes an ejector valve in fluid communication with a chamber having a piston. The piston is configured to engage the store. The ejector valve provides pressurized fluid to move the piston to eject the store when the system is in the deployed position. As an example, the piston is configured to travel over a stroke of at least twenty four inches.

In at least one example, the ejector valve includes a regulating orifice sized to controllably regulate flow of the pressurized fluid to cause an applied force to the piston to increase with stroke. The piston is configured to impart a high end-of-stroke velocity to the store. As a further example, the ejector valve also includes a poppet valve.

In at least one embodiment, a lower surface of the door panel is flush with an outer mold line of the aircraft when the system is in the stowed position.

In at least one embodiment, the aircraft is a hypersonic aircraft. In at least one example, the store is a munition.

In at least one embodiment, the system also includes a latch configured to retain the door panel in the closed position.

As an example, the actuator driven linkage includes an actuator operably coupled to a lower link arm and an upper link arm.

As an example, the pivot axis is defined by a hinge proximate to the forward edge of the door panel.

In at least one embodiment, the pivot axis is perpendicular to a longitudinal axis of the aircraft.

Certain embodiments of the subject disclosure provide a method for ejecting a store from an aircraft. The method includes retaining a store within a stowage tube having an open rear end; rotating a door panel, by an actuator driven linkage coupled to the door panel, about a pivot axis at a forward edge opposite from an aft end between a closed position associated with a stowed position of the system and an open position associated with a deployed position of the system; and rearwardly ejecting the store out of the open rear end when the system is in the deployed position.

Certain embodiments of the subject disclosure provide an aircraft including a system for ejecting a store, as described herein.

BRIEF DESCRIPTION OF THE DRAWINGS

FIG. 7 illustrates a lateral internal view of the system of FIG. 5 in the deployed position, according to an embodiment of the subject disclosure.

FIG. 8 illustrates a lateral internal view of the system of FIG. 7 in which a store is being forced out of the stowage tube.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the subject disclosure provide systems and methods for deploying one or more stores from an aircraft. In at least one embodiment, the aircraft is a hypersonic aircraft. The systems and methods include one or more drive mechanisms configured to direct the store(s) into an external air-stream. In particular, the stores are ejected in an aft direction away from a forward end of the aircraft, thereby reducing aerodynamic forces impacted on a mold line of the aircraft and the store. In at least one example, stored energy in the form of pressurized gas (for example, Nitrogen or Air) is utilized to eject the store(s) in the aft direction. In at least one example, a piston assembly provides a long impulse with low peak ejection forces, thereby ensuring a high end-of-stroke velocity (for example, 40 ft/sec) while reducing load on the store.

Certain examples of the subject disclosure provide an ejector system for ejecting a store from an aircraft. The ejector system includes an actuator drive linkage configured to cause an aft end of a door panel to rotate about a forward edge or end of the door panel between a stowed position (in which the door panel is flush with a mold line of the aircraft) and a deployed position. In at least one embodiment, a valve pressurizes a piston to push the store in a tube out through an open aft end into an air stream.

Figure 1:
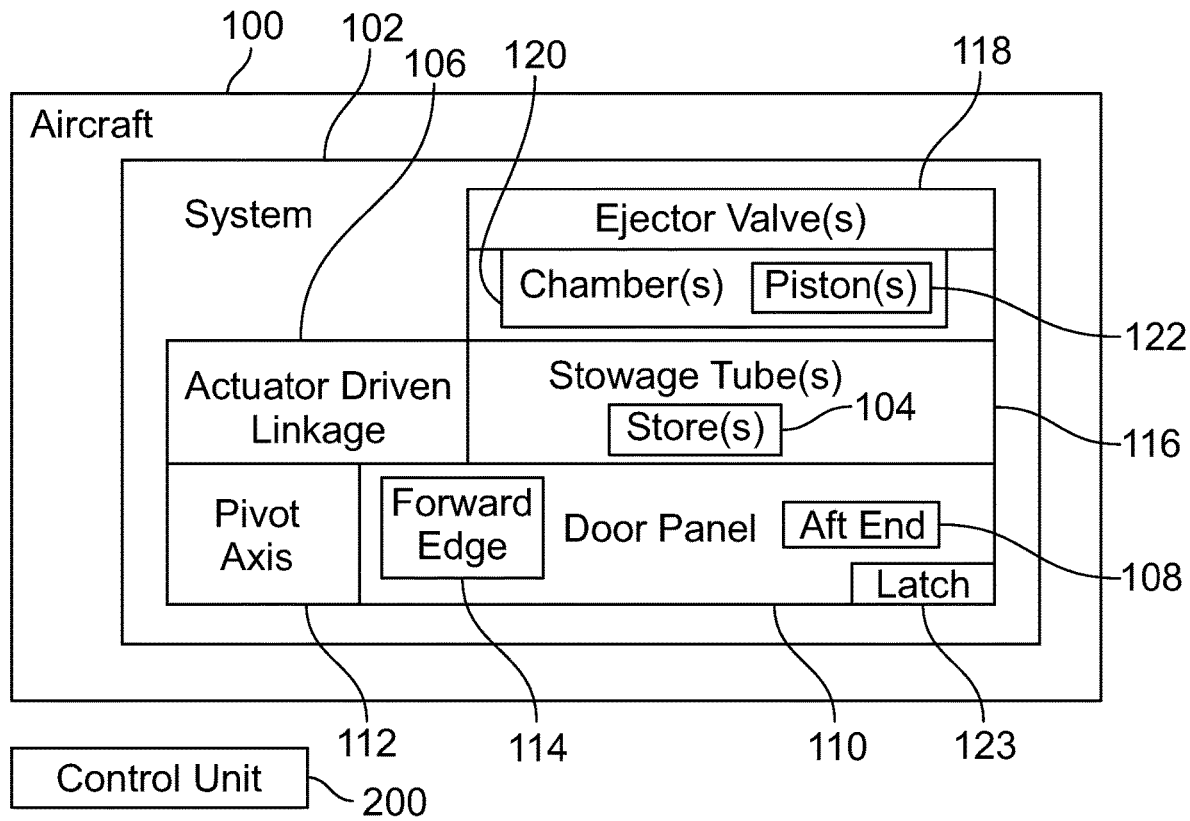
FIG. 1 illustrates a schematic block diagram of an aircraft including a system for ejecting one or more stores, according to an embodiment of the subject disclosure.

FIG. 1 illustrates a schematic block diagram of an aircraft 100 including a system 102 for ejecting one or more stores 104, according to an embodiment of the subject disclosure. In at least one example, the aircraft 100 is a hypersonic aircraft. Optionally, the aircraft 100 can be a subsonic or supersonic aircraft. The aircraft 100 can be a military or commercial jet, for example. As another example, the aircraft 100 can be a rotor type aircraft, such as a helicopter. The aircraft 100 can be manned, such as operated by one or more pilots. As another example, the aircraft 100 can be an unmanned aerial vehicle, such as a drone.

In at least one example, at least two stores 104 are within one or more bays of the aircraft 100. As a further example, three or more stores 104 are within one or more bays of the aircraft 100. Optionally, the system 102 retains a single store 104, such as within a single bay of the aircraft 100. Examples of the stores 104 include munitions including bombs, missiles, rockets, or the like, non-munitions, such as electronic equipment, products for delivery, items for dissemination in an area (such as pamphlets, notices, or the like), and/or the like.

In at least one example, the system 102 includes an actuator driven linkage 106 that is configured to cause rotation of an aft end 108 of a door panel 110 about a pivot axis 112 along a forward edge 114 of the door panel 110 to rotate the door panel 110 between a closed position (associated with a stowed position of the system 102) and an open position (associated with a deployed position of the system 102). The system 102 also includes one or more stowage tubes 116 disposed relative to the door panel 110 (such as above the door panel 110). The stowage tube(s) 116 are configured to contain the store(s) 104.

In at least one example, the system 102 also include one or more ejector valves 118 configured to selectively supply pressurized fluid to one or more chambers 120 to force one or more pistons 122 to push the store(s) out through the stowage tube(s) 116 and the open door panel 110 (that is, the door panel in the deployed position) into the air stream. In at least one embodiment, the ejector valve(s) 118 are open/close, pilot actuated valves configured to supply high pressure air to the system 102 when commanded into an open position. The ejector valve(s) 118 can be pneumatic valves configured to provide a gas, such as Nitrogen or Air, as the pressurized fluid. Optionally, the system 102 can employ hydraulics to provide the pressurized fluid. As another example, instead of pressurized fluid, a mechanical device, such as deployable springs, can be used to push the store(s) 104 out through the stowage tube(s) 116. As another example, one or more pyrotechnics can be used to provide the force the push the store(s) 104 out through the stowage tube(s) 116.

In at least one example, at least one store 104 is a munition facing a forward direction. The aft end 108 of the door panel 110 rotates to an open position in which an open end of the stowage tube 116 is directed in an aft direction, such that the munition is ejected in the aft direction out of the stowage tube 116.

In at least one example, the system 102 also includes a latch 123. The latch 123 is configured and operable to retain the door panel 110 in a closed position.

Figure 2:
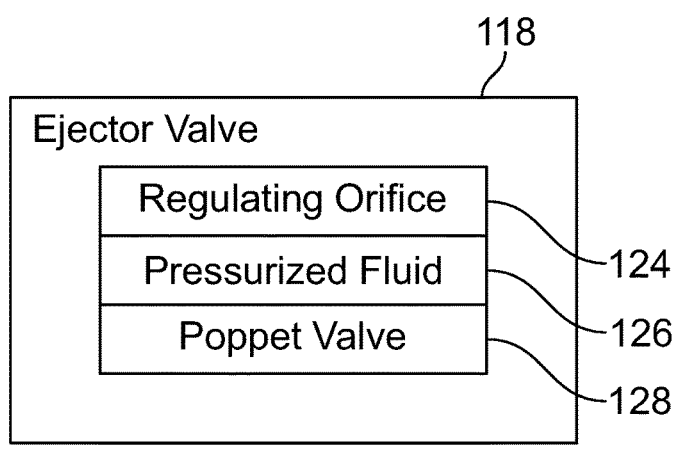
FIG. 2 illustrates a schematic block diagram of an ejector valve, according to an embodiment of the subject disclosure.

FIG. 2 illustrates a schematic block diagram of an ejector valve 118, according to an embodiment of the subject disclosure. Referring to FIGS. 1 and 2, as one example, the ejector valve 118 includes a regulating orifice 124 that is sized to controllably regulate flow of pressurized fluid 126 (such as Nitrogen or Air) to cause an applied force to the piston 122 to increase with stroke, such that the piston 122 imparts a high end-of-stroke velocity to the store 104 upon ejection from the stowage tube 116 (that is, the door panel 110 in the open position). In at least one embodiment, the ejector valve 118 also includes a poppet valve 128, which, along with a geometry of the regulating orifice 124, is configured to controllably regulate the flow of the pressurized fluid to match the volume of the chamber 120 as the poppet valve 128 expands and causes displacement of the piston 122.

Figure 3:
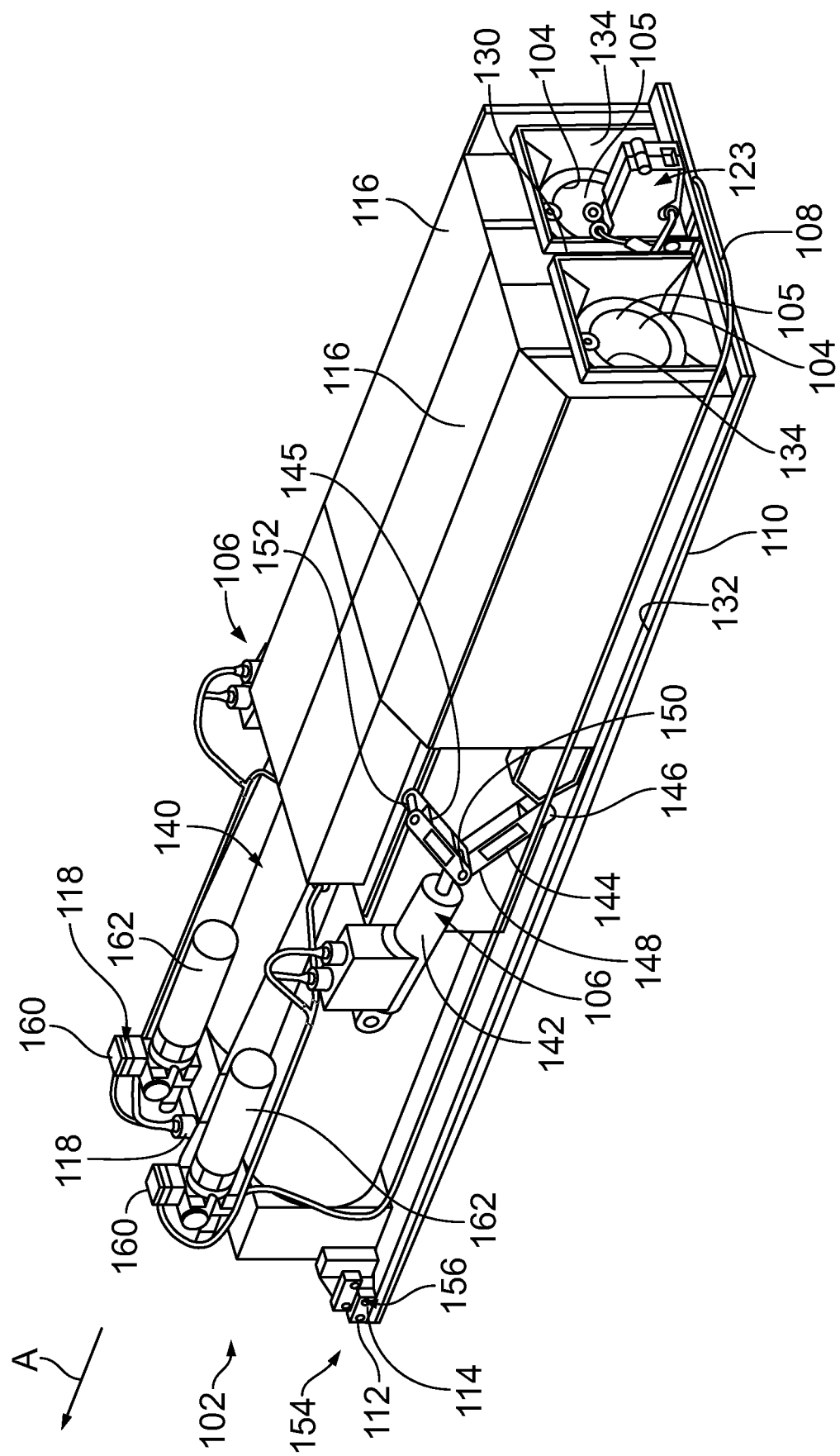
FIG. 3 illustrates a perspective top view of the system in a stowed position, according to an embodiment of the subject disclosure.

FIG. 3 illustrates a perspective top view of the system 102 in a stowed position, according to an embodiment of the subject disclosure. As shown, the system 102 includes two parallel stowage tubes 116, each of which contains a store 104. The latch 123 is coupled to a rear of the system 102, such as secured to the aft end 108 of the door panel 110 and/or aft edges 130 of the stowage tubes 116. The latch 123 is configured to securely couple to a reciprocal structure of the aircraft 100 (shown in FIG. 1) to secure the system 102 in the stowed position. Alternatively, the system 102 may not include the latch 123.

As shown, the stowage tubes 116 are mounted above an upper surface 132 of the door panel 110. The stowage tubes 116 have open rear ends 134 through which the stores 104 are ejected when the system 102 is in a deployed position.

In at least one example, the stores 104 are contained within the stowage tubes 116 in a forward facing direction A. For example, rear ends 105 of the stores 104 are proximate the open rear ends 134 of the stowage tubes 116 when the system 102 is in the stowed position.

As shown, the system 102 also includes a housing 140 coupled to the door panel 110 and the stowage tubes 116. The housing 140 is forward from the stowage tubes 116. For example, the housing 140 is closer to a forward end of the aircraft 100 than the stowage tubes 116. The actuator driven linkage 106 can be mounted to the housing 140. For example, an actuator driven linkage 106 is secured on either side of the system 102. Optionally, the system 102 can include a single actuator driven linkage 106.

The actuator driven linkage 106 includes an actuator 142 operably coupled to a lower link arm 144 and an upper link arm 145. The actuator 142 can be an electric actuator, such as an electric motor. Optionally, the actuator 142 can be a hydraulic actuator. As another example, the actuator 142 can be a pneumatic actuator.

The lower link arm 144 includes a first end 146 pivotally secured to a portion of the system 102, such as a side of the housing 140, the upper surface 132 of the door panel 110, and/or a front and/or lateral surface of a stowage tube 116. The lower link arm 144 also includes a second end 148 opposite from the first end 146. The second end 148 is pivotally coupled to a first end 150 of the upper link arm 145. In at least one embodiment, the actuator 142 is operably coupled (such as via a movable arm) to a pivotal coupling of the second end 148 of the lower link arm 144 and the first end 150 of the upper link arm 145. Optionally, the actuator 142 can be operably coupled to one or more other portions of the lower link arm 144 and/or the upper link arm 145.

The upper link arm 145 also includes a second end 152 opposite from the first end 150. The second end 152 is pivotally secured to a portion of the aircraft 100 (shown in FIG. 1), such as a fixed portion of a fuselage.

Optionally, the actuator driven linkage 106 can be configured differently than shown. For example, the actuator driven linkage 106 can include more or less link arms. As an example, the actuator 142 can be operably coupled to a single rotational link arm.

The pivot axis 112 is at a forward end 154 of the system 102. For example, the pivot axis 112 is defined by a hinge 156 secured to and/or proximate to the forward edge 114 of the door panel 110.

As shown, the system 102 can include two ejector valves 118. Each ejector valve 118 is associated with a respective stowage tube 116. The ejectors valves 118 can include a solenoid pilot valve assembly 160 coupled to an accumulator 162, such as a pressurized cylinder of gas.

Figure 4:
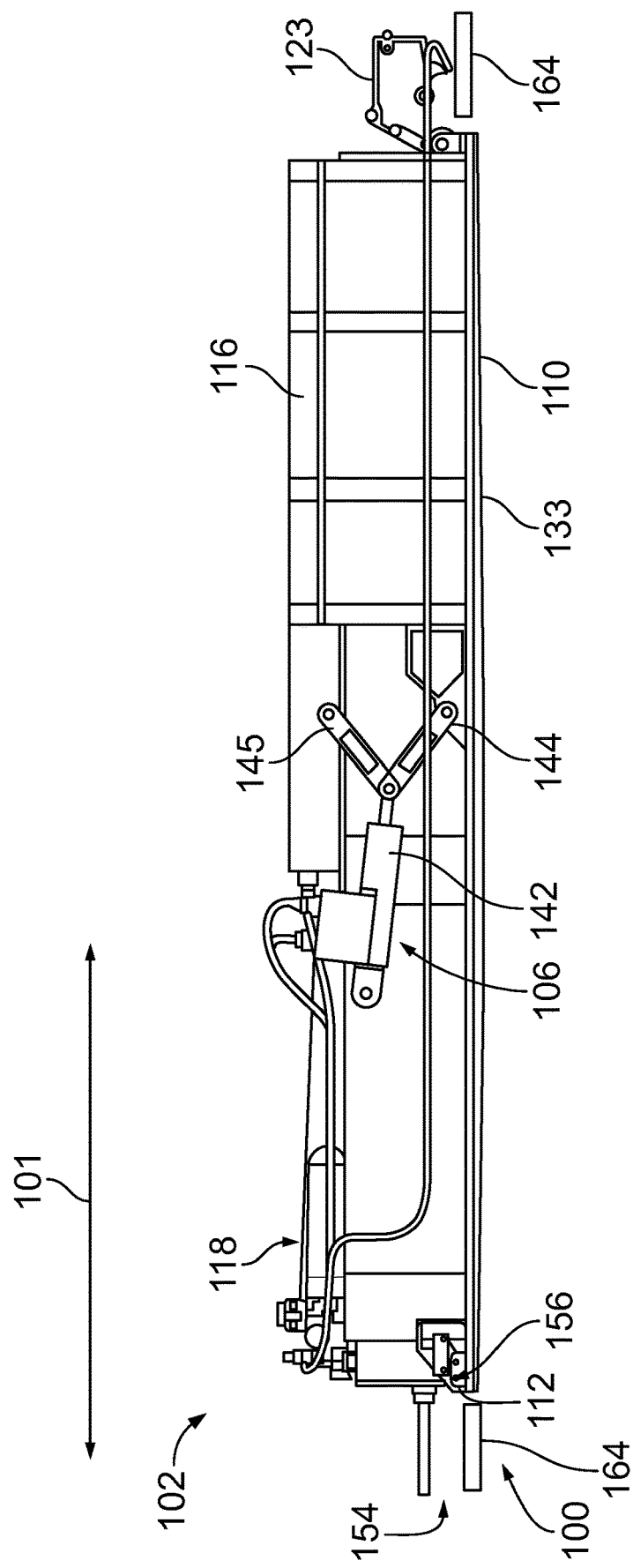
FIG. 4 illustrates a lateral view of the system of FIG. 3 in the stowed position.

FIG. 4 illustrates a lateral view of the system 102 of FIG. 3 in the stowed position. Referring to FIGS. 3 and 4, in the latch 123 securely latches to a reciprocal structure of the aircraft 100 in the stowed position, to ensure that the stores 104 are retained within the aircraft 100. As shown, in the stowed position, a lower surface 133 of the door panel 110 is flush with an outer mold line 164 of the aircraft 100.

In at least one embodiment, the pivot axis 112 is perpendicular to a longitudinal axis 101 of the aircraft 100. The system 102 (including the door panel 110) does not open from an inboard position to an outboard position (or vice versa). Instead, the system 102 opens such that the open rear ends 134 of the stowage tubes 116 are exposed, but shielded from the air stream by the door panel 110. As such, the door panel 110 is configured to open about the pivot axis 112 to shield the stores 104 from an air stream.

Figure 5:
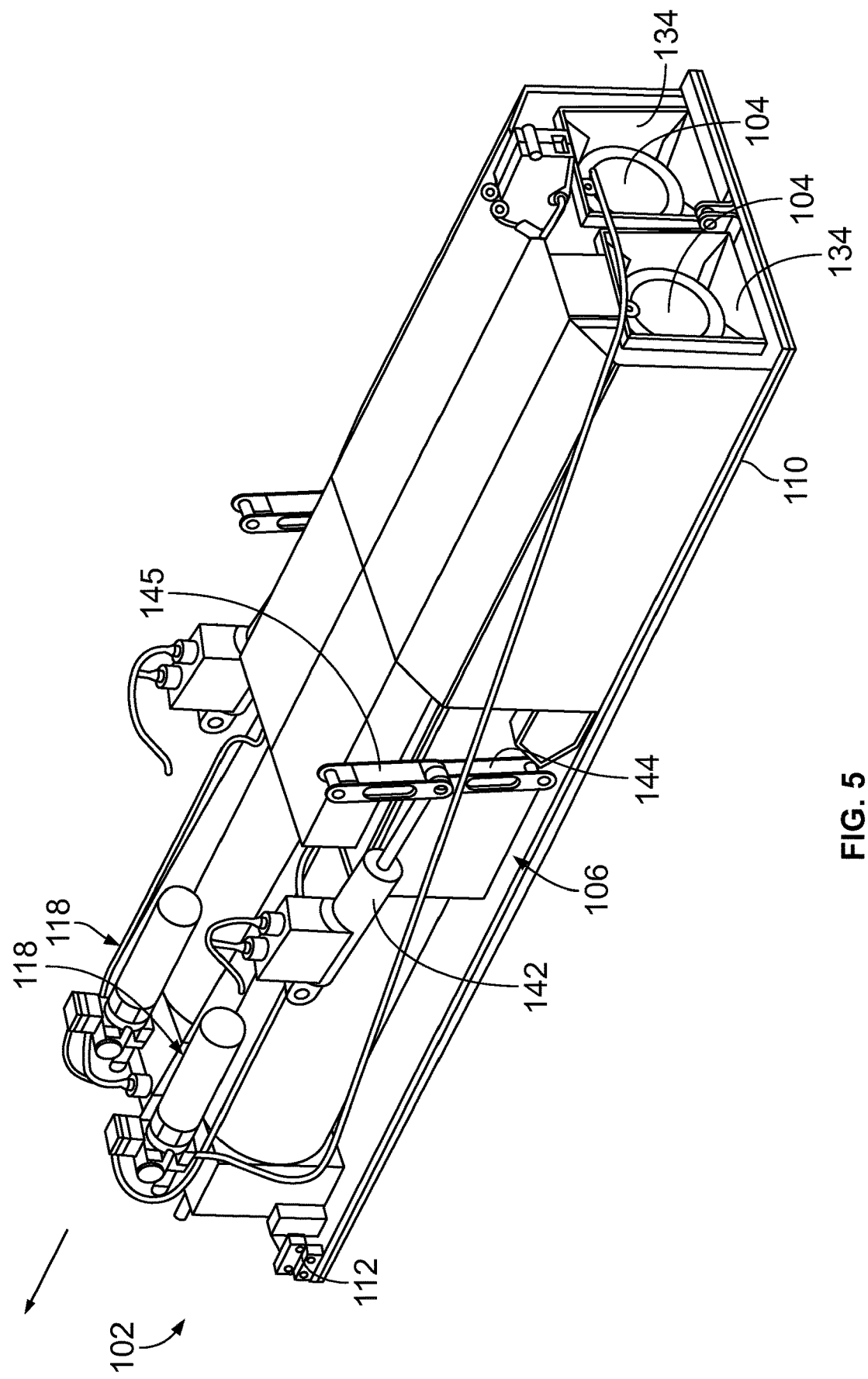
FIG. 5 illustrates a perspective top view of the system of FIG. 3 in a deployed position, according to an embodiment of the subject disclosure.
Figure 6:
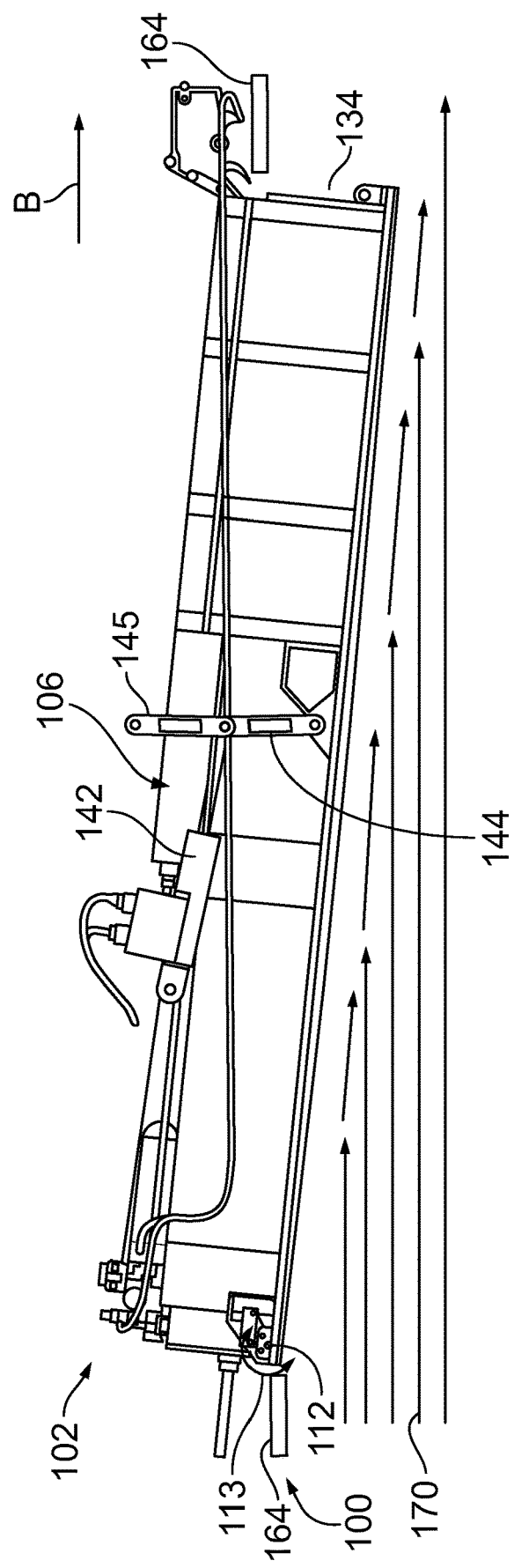
FIG. 6 illustrates a lateral view of the system of FIG. 5 in the deployed position.

FIG. 5 illustrates a perspective top view of the system 102 of FIG. 3 in a deployed position, according to an embodiment of the subject disclosure. FIG. 6 illustrates a lateral view of the system 102 of FIG. 5 in the deployed position. In order to move the system 102 into the deployed position, the actuator driven linkage 106 is activated into an extended position. For example, the actuator(s) 142 are operated to pivot the lower link arm 144 and the upper link arm 145 into a straight (or substantially straight) position, thereby forcing the door panel 110 to open about the pivot axis 112. In this manner, the stowage tubes 116 are pivoted downwardly below the mold line 164 such that the open rear ends 134 of the stowage tubes 116 are exposed below and rearwardly. At the same time, the lower surface 133 of the door panel 110 shields the stores 104 from an air stream 170. The ejector valves 118 are operated to force the stores 104 rearwardly out of the open rear ends 134 of the stowage tubes 116 in an aft direction B, in contrast to being dropped downwardly into the air stream 170. As such, the system 102 is configured to eject the stores 104 rearwardly in the direction of the air stream 170, which, in turn, assists in further ejecting the stores 104 out of the open stowage tubes 116.

As described herein, ejection of the stores 104 in the aft direction B eliminates, mitigates, or otherwise reduces the difficulties inherent in hypersonic store release. Relatively small rotations about the pivot axis 112 in the direction of arc 113 (such as less than 10°) are used to clear the stores 104 for release. Such small rotation reduces an impact on the mold line 164 of the aircraft 100. Further, the small rotation in the direction of arc 113 allows for continuous aerodynamic sealing and thermal protection at the pivot axis 112. As a result, the ejector valves 118, the actuator driven linkage 106, the stowage tubes 116, and the like are protected from potential extreme air-loads and temperatures at and/or proximate surfaces of the aircraft 100.

FIG. 7 illustrates a lateral internal view of the system 102 of FIG. 5 in the deployed position, according to an embodiment of the subject disclosure. FIG. 8 illustrates a lateral internal view of the system 102 of FIG. 7 in which the store 104 is being forced out of the stowage tube 116. Referring to FIGS. 1-8, the ejector valve 118 stores the pressurized fluid in the accumulator 162. As the system 102 is moved into the deployed position, solenoid pilot valve assembly 160 opens the regulating orifice 124 to fill a pressure chamber 180 with the pressurized fluid. The pressure chamber 180 is between a fixed wall 182 and a fore end 184 of the piston 122. The force of the pressurized fluid forces the piston rearwardly in the direction of arrow C over a stroke 197, which in turn forces the store 104 out of the open rear end 134 of the stowage tube 116.

The store 104 has a front end 107 proximate to the piston 122. The store 104 is oriented within the stowage chamber 116 such that the front end 107 is oriented in the fore direction A toward a front end of the aircraft 100, while the rear end 105 is oriented in the opposite aft direction B. The store 104 is ejected from the stowage tube 116 such that the rear end 105 passes out of the open rear end 134 before the front end 107.

An ejector rail sub-system 190 can be disposed within the stowage tube 116. The ejector rail sub-system 190 includes one or more rails that are configured to guide the store 104 out of the stowage tube 116 when the system 102 is in the deployed position. As an example, the ejector rail subsystem 190 can utilize a standard missile hanger with latch for captive carry and release of the store 104. The motion of the store 104 can be constrained by the ejector rail subsystem 190 and piston 122 during captive carry and ejection.

With hypersonic aircraft, because of a potential turbulent flow field and shocks near surfaces of the aircraft 100, a high end-of-stroke velocity (~40 ft/sec) of the piston 122 can be used to ensure safe separation of the store 104 from the system 102 during ejection of the store 104. To achieve the high end-of-stroke velocity while not exceeding an acceleration limit of the store 104, a long piston stroke 197 can be used to lengthen the ejection impulse. For example, the long piston stroke 197 can be at least 24 inches. As a more particular example, the long piston stroke 197 can be 25.7 inches. Optionally, the long piston stroke can be less than 24 inches, or greater than 25.7 inches.

Figure 9:
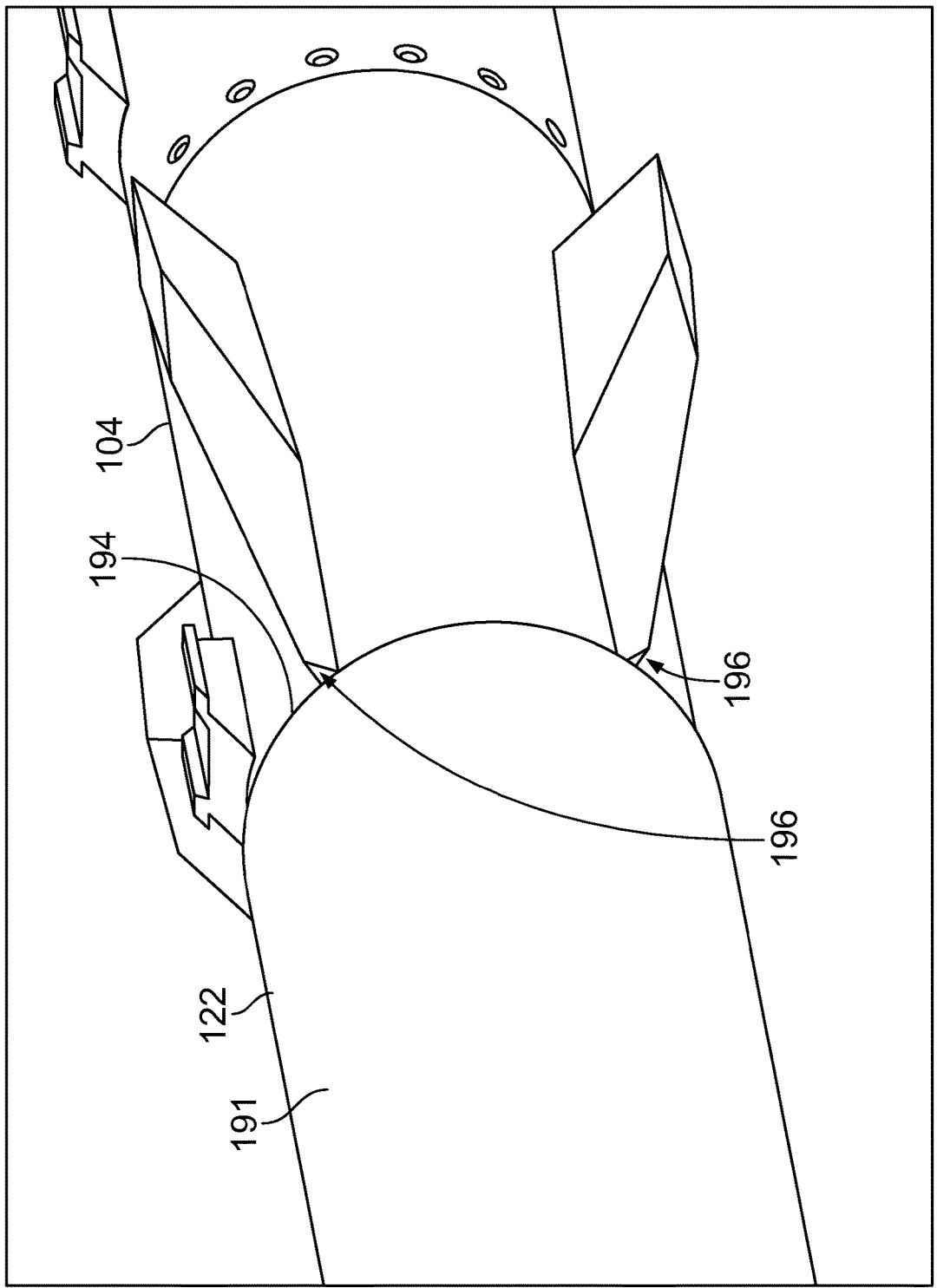
FIG. 9 illustrates a perspective view of a piston engaging a store, according to an embodiment of the subject disclosure.

FIG. 9 illustrates a perspective view of the piston 122 engaging the store 104, according to an embodiment of the subject disclosure. Referring to FIGS. 7-9, the piston 122 includes an outer cylinder 191 defining an interior chamber 192. A portion of the front end 107 of the store 104 can be disposed within the interior chamber 192. An aft rim 194 of the piston 122 abuts against portions of the store 104 (to exert ejection force into the store). For example, the aft rim 194 of the piston 122 can abut against flattened protuberances 196 (such as part of or otherwise on) fins of the store 104.

Referring to FIGS. 1-9, the system 102 provides safe release of the stores 104 from the aircraft 100, such as a hypersonic aircraft. The ejector valves 118 provide stored energy in the form of pressurized gas to eject the stores 104 out of the stowage tubes 116 in the aft direction B. End-of-stroke velocities obtained from the system 102 are sufficient to achieve safe separation of the stores 104 from the aircraft 100 as the stores 104 are ejected.

As described herein, the system 102 for ejecting a store 104 from an aircraft 100 includes a stowage tube 116 configured to retain the store 104. The stowage tube includes an open rear end 134. A door panel 110 is coupled to the stowage tube 116. An actuator driven linkage 106 is coupled to the door panel 110. The actuator driven linkage 106 is configured to rotate the door panel 110 about a pivot axis 112 at a forward edge 114 opposite from an aft end 1108 between a closed position associated with a stowed position of the system 102 and an open position associated with a deployed position of the system 102. The stowage tube 116 is configured to rearwardly eject the store 104 out of the open rear end 134 when the system 102 is in the deployed position. In at least one embodiment, the system 102 also includes an ejector valve 118 in communication with a chamber 120 having a piston 122. The piston 122 is configured to engage the store 104. The ejector valve 118 provides pressurized gas to move the piston 122 to eject the store 104 when the system 102 is in the deployed position.

In at least one embodiment, a control unit 200 is configured to control operation of the system 102. For example, the control unit 200 is configured to move the door panel 110 between the open position and the closed position, in which the open position is associated with the deployed position of the system 102, and the closed position is associated with the stowed position of the system 102. The control unit 200 is in communication with the actuator drive linkage 106, such as through one more wired or wireless connections. For example, the control unit 200 is in communication with the actuator(s) 142 and controls operation thereof. Further, the control unit 200 is in communication with the ejector valve(s) 118, such as through one or more wired or wireless connections. The control unit 200 is configured to control operation of the ejector valve(s) 118, as described herein, in order to eject the stores 104 from the stowage tubes 116.

When the system 102 is commanded to deploy, the control unit 200 operate the latch 123 into an unlatched position, and operates the actuator driven linkage 106 to move into the extended position shown in FIGS. 5 and 6. In response, the system 102 pivots about the pivot axis 112, as described herein. In at least one embodiment, the actuators 142 fully extend and lock internally to hold the actuator driven linkage 106 in position. At this point the control unit 200 can operate the ejectors valves 118, as described herein, to eject the stores 104 rearwardly out of the exposed open rear ends 134 of the stowage tubes 116. After the store(s) 104 have been safely ejected, the control unit 200 operate the actuator driven linkage to move the system 102 back to the stowed position (as shown in FIGS. 3 and 4).

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 200 can be or include one or more processors that are configured to control operation thereof, as described herein.

The control unit 200 is configured to execute a set of instructions that are stored in one or more data storage units or elements (such as one or more memories), in order to process data. For example, the control unit 200 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit(s), such as the control unit 200, as a processing machine to perform specific operations such as the methods and processes of the various examples of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of examples herein can illustrate one or more control or processing units, such as the control unit 200. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit(s), such as the control unit 200, can represent processing circuitry such as one or more of a field programmable gate array (FPGA), application specific integrated circuit (ASIC), microprocessor(s), and/or the like. The circuits in various examples can be configured to execute one or more algorithms to perform functions described herein. The one or more algorithms can include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 10:
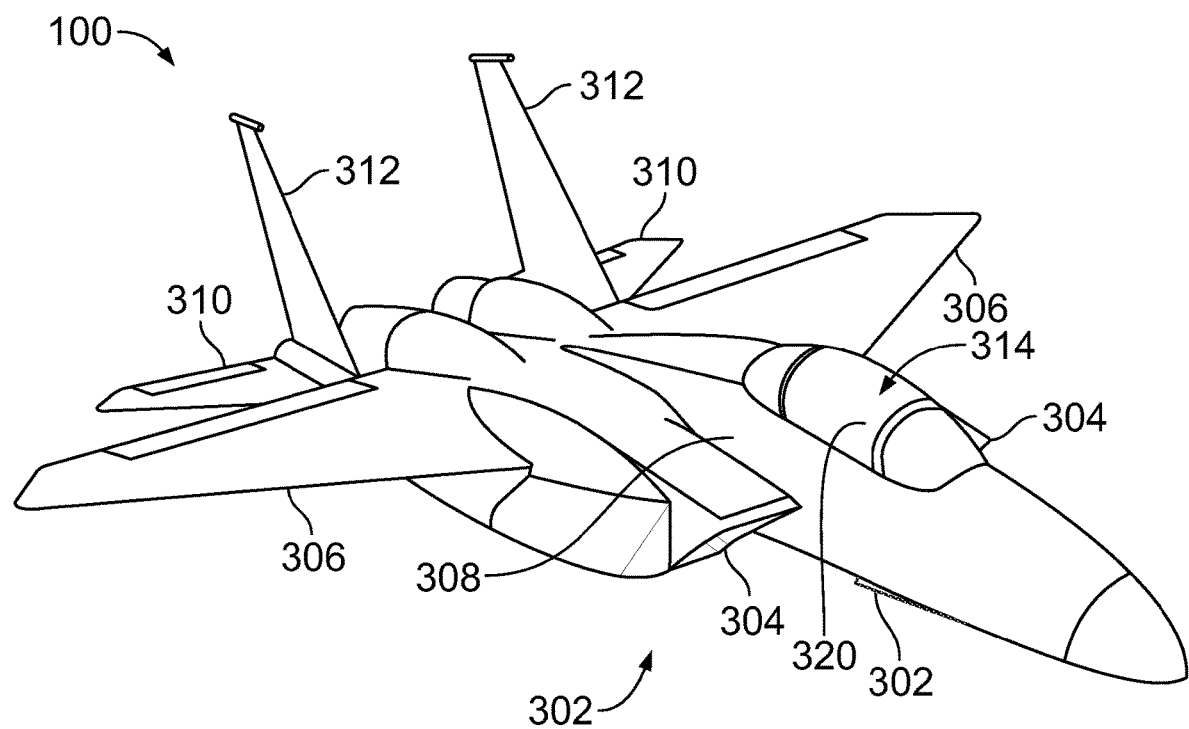
FIG. 10 illustrates a perspective front view of an aircraft, according to an embodiment of the subject disclosure.

FIG. 10 illustrates a perspective front view of an aircraft 100, according to an example of the subject disclosure. As shown, the aircraft 100 can be a military fighter jet. In at least one embodiment, the aircraft 100 is a hypersonic jet. The aircraft 100 includes a propulsion system 302 that includes two engines 304, for example. Optionally, the propulsion system 302 may include more or less engines 304 than shown. The engines 304 are carried by wings 306 and/or a fuselage 308 of the aircraft 100. In other embodiments, the engines 304 may be carried by other portions of the aircraft 100. The fuselage 308 also supports horizontal stabilizers 310 and vertical stabilizers 312. The fuselage 308 of the aircraft 100 includes a cockpit 314 covered by a canopy 320. The aircraft 100 can include an ejection system 302 that includes a door, which is shown in the deployed position in FIG. 10, and may be equivalent to system 102 in FIGS. 1-8. Optionally, the aircraft 100 may be various other types of military aircraft, which may or may not include wings. For example, the aircraft 100 may be a helicopter. Alternatively, the aircraft may be various types of commercial aircraft, such as commercial jets, helicopters, or the like. As another example, the aircraft 100 can be an unmanned aerial vehicle (UAV).

Figure 11:
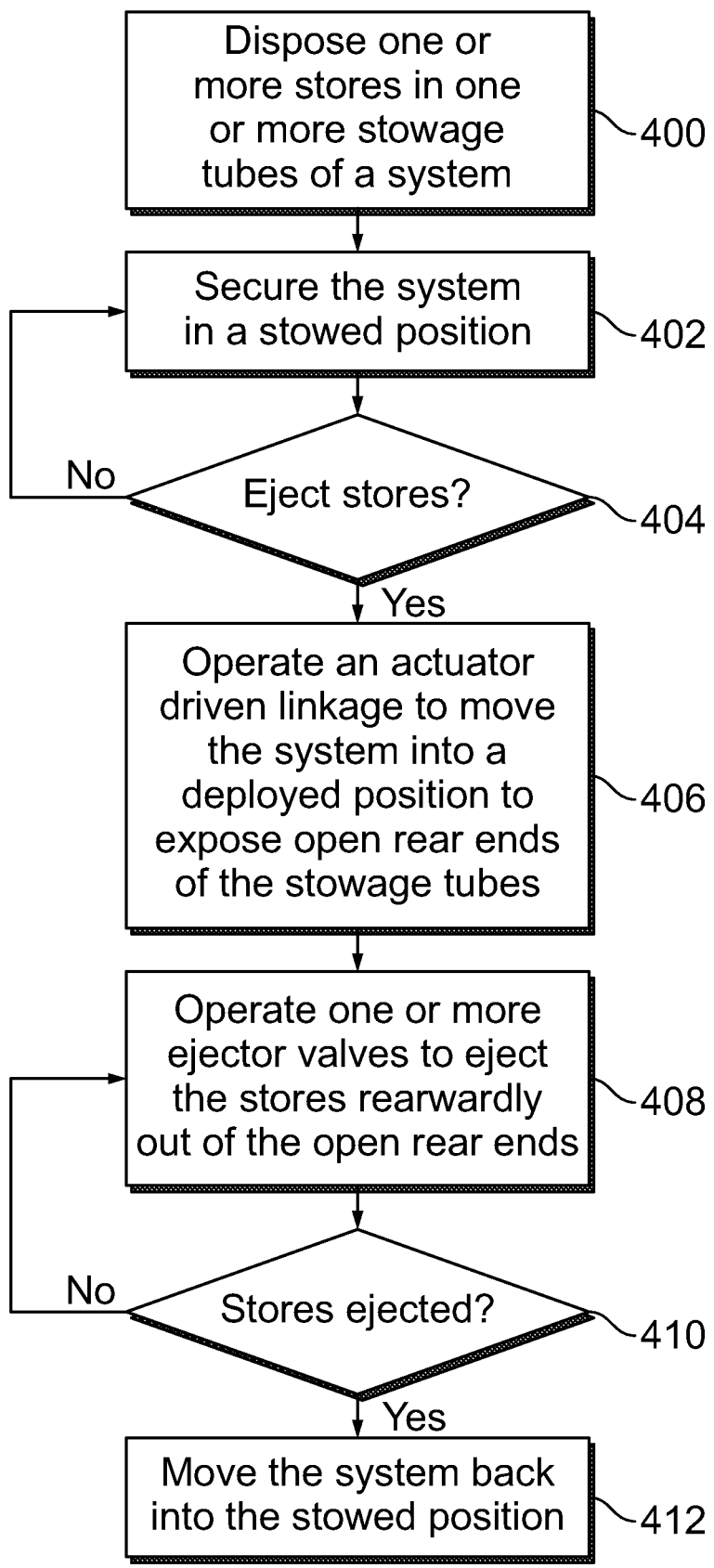
FIG. 11 illustrates a flow chart of a method of ejecting one or more stores from an aircraft, according to an embodiment of the subject disclosure.

FIG. 11 illustrates a flow chart of a method of ejecting one or more stores from an aircraft, according to an embodiment of the subject disclosure. Referring to FIGS. 1 and 11, the method may begin at 400, at which one or more stores 104 are disposed in one or more stowage tubes 116 of the system 102. At 402, the system is secured in a stowed position, such as in which the lower surface of the door panel 110 is flush with a mold line of a lower surface of the aircraft 100.

At 404, it is determined (such as by an operator of the aircraft 100) if the stores 104 are to be ejected. If not, the method returns to 402.

If, however, the operator outputs a command to eject the stores 104 at 404, an actuator drive linkage 106 is operated, such as by the control unit 200, to move the system 102 into a deployed position to expose open rear ends of the stowage tubes 116 (while the door panel 110 shields the stores 104 from an air stream). At 408, one or more ejector valves 118 are operated, such as by the control unit 200, to eject the stores 104 rearwardly out of the open rear ends of the stowage tubes 116.

At 410, it is determined (such as by the control unit 200, which can be in communication with a sensing sub-system) if the stores 104 have been ejected. If not, the method returns to 408. If, however, the stores 104 have been ejected, the method proceeds to 412, at which the system 102 is moved back into the stowed position (such as via the control unit 200 operating the actuator driven linkage 106).

Figure 12:
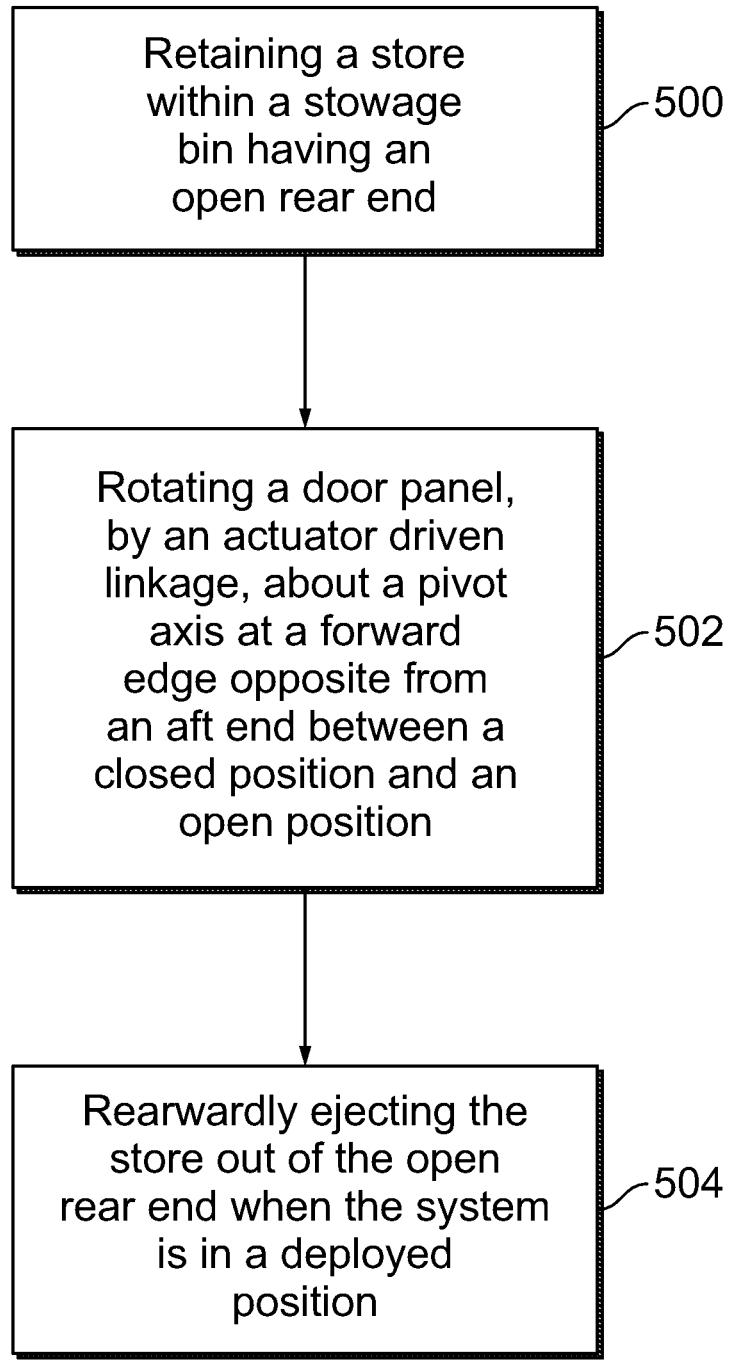
FIG. 12 illustrates a flow chart of a method of ejecting a store from an aircraft, according to an embodiment of the subject disclosure.

FIG. 12 illustrates a flow chart of a method for ejecting a store from an aircraft, according to an embodiment of the subject disclosure. The method includes retaining, at 500, a store within a stowage tube having an open rear end; rotating, at 502, a door panel, by an actuator driven linkage coupled to the door panel, about a pivot axis at a forward edge opposite from an aft end between a closed position associated with a stowed position of the system and an open position associated with a deployed position of the system; and rearwardly ejecting, at 504, the store out of the open rear end when the system is in the deployed position. In at least one embodiment, the method also includes engaging the store with a piston disposed within a chamber that is in communication with an ejector valve; and providing, by the ejector valve, pressurized fluid to move the piston to eject the store when the system is in the deployed position.

Further, the disclosure comprises examples according to the following clauses:

Clause 1. A system for ejecting a store from an aircraft, the system comprising:

a stowage tube configured to retain the store, wherein the stowage tube includes an open rear end;

a door panel coupled to the stowage tube; and an actuator driven linkage coupled to the door panel, wherein the actuator driven linkage is configured to rotate the door panel about a pivot axis at a forward edge opposite from an aft end between a closed position associated with a stowed position of the system and an open position associated with a deployed position of the system, and wherein the stowage tube is configured to rearwardly eject the store out of the open rear end when the system is in the deployed position.

Clause 2. The system of Clause 1, further comprising an ejector valve in fluid communication with a chamber having a piston, wherein the piston is configured to engage the store, and wherein the ejector valve provides pressurized fluid to move the piston to eject the store when the system is in the deployed position.

Clause 3. The system of claim Clause 2, wherein the piston is configured to travel over a stroke of at least twenty four inches.

Clause 4. The system of Clauses 2 or 3, wherein the ejector valve comprises a regulating orifice sized to controllably regulate flow of the pressurized fluid to cause an applied force to the piston to increase with stroke, wherein the piston is configured to impart a high end-of-stroke velocity to the store.

Clause 5. The system of Clause 4, wherein the ejector valve further comprises a poppet valve.

Clause 6. The system of any of Clauses 1-5, wherein a lower surface of the door panel is flush with an outer mold line of the aircraft when the system is in the stowed position.

Clause 7. The system of any of Clauses 1-6, wherein the aircraft is a hypersonic aircraft.

Clause 8. The system of any of Clauses 1-7, wherein the store is a munition.

Clause 9. The system of any of Clauses 1-8, further comprising a latch configured to retain the door panel in the closed position.

Clause 10. The system of any of Clauses 1-9, wherein the actuator driven linkage comprises an actuator operably coupled to a lower link arm and an upper link arm.

Clause 11. The system of any of Clauses 1-10, wherein the pivot axis is defined by a hinge proximate to the forward edge of the door panel.

Clause 12. The system of any of Clauses 1-11, wherein the pivot axis is perpendicular to a longitudinal axis of the aircraft.

Clause 13. A method for ejecting a store from an aircraft, the method comprising:
  retaining a store within a stowage tube having an open rear end;
  rotating a door panel, by an actuator driven linkage coupled to the door panel, about a pivot axis at a forward edge opposite from an aft end between a closed position associated with a stowed position of the system and an open position associated with a deployed position of the system; and
  rearwardly ejecting the store out of the open rear end when the system is in the deployed position.

Clause 14. The method of Clause 13, further comprising:
  engaging the store with a piston disposed within a chamber that is in communication with an ejector valve; and
  providing, by the ejector valve, pressurized fluid to move the piston to eject the store when the system is in the deployed position.

Clause 15. The method of Clauses 13 or 14, wherein a lower surface of the door panel is flush with an outer mold line of the aircraft when the system is in the stowed position.

Clause 16. The method of any of Clauses 13-15, further comprising retaining, by a latch, the door panel in the closed position.

Clause 17. The method of any of Clauses 13-16, wherein the pivot axis is perpendicular to a longitudinal axis of the aircraft.

Clause 18. An aircraft comprising:
  a system for ejecting a store, the system comprising:
    a stowage tube configured to retain the store, wherein the stowage tube includes an open rear end;
    a door panel coupled to the stowage tube;
    an actuator driven linkage coupled to the door panel, wherein the actuator driven linkage is configured to rotate the door panel about a pivot axis at a forward edge opposite from an aft end between a closed position associated with a stowed position of the system and an open position associated with a deployed position of the system, wherein the pivot axis is perpendicular to a longitudinal axis of the aircraft, and wherein the stowage tube is configured to rearwardly eject the store out of the open rear end when the system is in the deployed position; and
    an ejector valve in fluid communication with a chamber having a piston, wherein the piston is configured to engage the store, and wherein the ejector valve provides pressurized fluid to move the piston to eject the store when the system is in the deployed position.

Clause 19. The aircraft of Clause 18, wherein a lower surface of the door panel is flush with an outer mold line of the aircraft when the system is in the stowed position.

Clause 20. The aircraft of Clauses 18 or 19, wherein the aircraft is a hypersonic aircraft.

As described herein, embodiments of the subject disclosure provide efficient and effective systems and methods for deploying one or more stores from an aircraft. Further, a embodiments of the subject disclosure provide systems and methods for deploying one or more stores from a hypersonic aircraft.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for ejecting a store from an aircraft, the system comprising:
   a stowage tube configured to retain the store, wherein the stowage tube includes an open rear end;
   a door panel coupled to the stowage tube, wherein the stowage tube is mounted on the door panel;
   an actuator driven linkage coupled to the door panel, wherein the actuator driven linkage is configured to rotate the door panel about a pivot axis at a forward edge opposite from an aft end between a closed position associated with a stowed position of the system and an open position associated with a deployed position of the system, and wherein the stowage tube is configured to rearwardly eject the store out of the open rear end when the system is in the deployed position; and
   an ejector valve in fluid communication with a chamber having a piston, wherein the ejector valve comprises a poppet valve.

2. The system of claim 1, further comprising an ejector valve in fluid communication with a chamber having a piston, wherein the piston is configured to engage the store, and wherein the ejector valve provides pressurized fluid to move the piston to eject the store when the system is in the deployed position.

3. The system of claim 2, wherein the piston is configured to travel over a stroke of at least twenty four inches.

4. The system of claim 2, wherein the ejector valve comprises a regulating orifice sized to controllably regulate flow of the pressurized fluid to cause an applied force to the piston to increase with stroke, wherein the piston is configured to impart an end-of-stroke velocity to the store.

5. A system for ejecting a store from an aircraft, the system comprising:
   a stowage tube configured to retain the store, wherein the stowage tube includes an open rear end;
   a door panel coupled to the stowage tube;
   an actuator driven linkage coupled to the door panel, wherein the actuator driven linkage is configured to rotate the door panel about a pivot axis at a forward edge opposite from an aft end between a closed position associated with a stowed position of the system and an open position associated with a deployed position of the system, and wherein the stowage tube is configured to rearwardly eject the store out of the open rear end when the system is in the deployed position, an ejector valve in fluid communication with a chamber having a piston, wherein the piston is configured to engage the store, and wherein the ejector valve provides pressurized fluid to move the piston to eject the store when the system is in the deployed position, wherein the ejector valve comprises:
      a poppet valve; and
      a regulating orifice sized to controllably regulate flow of the pressurized fluid to cause an applied force to the piston to increase with stroke, wherein the piston is configured to impart an end-of-stroke velocity to the store.

6. The system of claim 5, wherein a lower surface of the door panel is flush with an outer mold line of the aircraft when the system is in the stowed position.

7. The system of claim 5, wherein the aircraft is a hypersonic aircraft.

8. The system of claim 5, wherein the store is a munition.

9. The system of claim 5, further comprising a latch configured to retain the door panel in the closed position.

10. The system of claim 5, wherein the actuator driven linkage comprises an actuator operably coupled to a lower link arm and an upper link arm.

11. The system of claim 5, wherein the pivot axis is defined by a hinge proximate to the forward edge of the door panel.

12. The system of claim 5, wherein the pivot axis is perpendicular to a longitudinal axis of the aircraft.

13. A method for ejecting a store from an aircraft, the method comprising:
   retaining a store within a stowage tube having an open rear end, wherein the stowage tube is mounted on a door panel;
   rotating the door panel, by an actuator driven linkage coupled to the door panel, about a pivot axis at a forward edge opposite from an aft end between a closed position associated with a stowed position of the system and an open position associated with a deployed position of the system;
   engaging the store with a piston disposed within a chamber that is in communication with an ejector valve having a poppet valve; and
   rearwardly ejecting the store out of the open rear end when the system is in the deployed position.

14. The method of claim 13, further comprising providing, by the ejector valve, pressurized fluid to move the piston to eject the store when the system is in the deployed position.

15. The method of claim 13, wherein a lower surface of the door panel is flush with an outer mold line of the aircraft when the system is in the stowed position.

16. The method of claim 13, further comprising retaining, by a latch, the door panel in the closed position.

17. The method of claim 13, wherein the pivot axis is perpendicular to a longitudinal axis of the aircraft.

18. An aircraft comprising:
   a system for ejecting a store, the system comprising:
      a stowage tube configured to retain the store, wherein the stowage tube includes an open rear end;
      a door panel coupled to the stowage tube, wherein the stowage tube is mounted on the door panel;
      an actuator driven linkage coupled to the door panel, wherein the actuator driven linkage is configured to rotate the door panel about a pivot axis at a forward edge opposite from an aft end between a closed position associated with a stowed position of the system and an open position associated with a deployed position of the system, wherein the pivot axis is perpendicular to a longitudinal axis of the aircraft, and wherein the stowage tube is configured to rearwardly eject the store out of the open rear end when the system is in the deployed position; and
      an ejector valve in fluid communication with a chamber having a piston, wherein the piston is configured to engage the store, and wherein the ejector valve provides pressurized fluid to move the piston to eject the store when the system is in the deployed position, and wherein the ejector valve comprises a poppet valve.

19. The aircraft of claim 18, wherein a lower surface of the door panel is flush with an outer mold line of the aircraft when the system is in the stowed position.

20. The aircraft of claim 18, wherein the aircraft is a hypersonic aircraft.

\* \* \* \* \*